United States Patent [19]
Cassidy et al.

[11] Patent Number: 5,416,864
[45] Date of Patent: May 16, 1995

[54] OPTICAL FIBER AMPLIFIED TAPPING NETWORK AND METHOD USING SAME

[75] Inventors: Stephen A. Cassidy; Fiona Mackenzie, both of Ipswich; Trevor K. White, Felixstowe, all of England

[73] Assignee: British Telecommunications public limited company, London, England

[21] Appl. No.: 50,163
[22] PCT Filed: Nov. 20, 1991
[86] PCT No.: PCT/GB91/02052
  § 371 Date: Apr. 30, 1993
  § 102(e) Date: Apr. 30, 1993
[87] PCT Pub. No.: WO92/09150
  PCT Pub. Date: May 29, 1992

[30] Foreign Application Priority Data
Nov. 20, 1990 [GB] United Kingdom ............... 9025207

[51] Int. Cl.⁶ ............... G02B 6/28; H01S 3/14
[52] U.S. Cl. ............... 385/30; 385/15; 385/27; 385/24; 385/42; 385/48; 359/134; 359/333; 359/341; 359/345; 372/6
[58] Field of Search ............ 385/15, 24, 27, 29, 385/30, 31, 42, 46, 48; 372/6; 359/126, 133, 134, 333, 340, 341, 342, 345

[56] References Cited

U.S. PATENT DOCUMENTS

| | | | |
|---|---|---|---|
| 4,515,431 | 5/1985 | Shaw et al. | 372/6 X |
| 4,963,832 | 10/1990 | Desurvire et al. | 385/30 |
| 5,115,338 | 5/1992 | DiGiovanni et al. | 372/6 X |
| 5,119,230 | 6/1992 | Pfeiffer | 359/341 |
| 5,185,814 | 2/1993 | Healey | 372/6 X |
| 5,224,116 | 6/1993 | Whitley et al. | 372/6 X |
| 5,297,154 | 3/1994 | Heidemann et al. | 372/6 |
| 5,321,708 | 6/1994 | Tohmon et al. | 372/6 |
| 5,323,474 | 6/1994 | Hornung et al. | 385/24 |
| 5,337,401 | 8/1994 | Onishi et al. | 385/142 |

FOREIGN PATENT DOCUMENTS

| | | | |
|---|---|---|---|
| 0112090 | 6/1984 | European Pat. Off. | 372/6 X |
| 0324541 | 7/1989 | European Pat. Off. | 372/6 X |

OTHER PUBLICATIONS

PCT International Search Report, *European Patent Office*, completed Feb. 12, 1992.
IEEE Photonics Technology Letters, vol. 2, No. 3, pp. 220–222, Mar. 1990.
Patent Abstracts of Japan, vol. 10, No. 288, (P-502) (2344) May. 1986.

*Primary Examiner*—Brian Healy
*Attorney, Agent, or Firm*—Nixon & Vanderhye

[57] ABSTRACT

An optical network includes an erbium-doped silica-based optical fibre having a D-shaped cross-section. The wave-guide carries information signals at 1.53 μm from a signal source and provides amplification to the information signals when pumped by an optical pump source operating at 0.994 μm. Optical signals are tapped from the waveguide by means of evanescent couplers. The waveguide provides amplification to at least partially restore tapping loss to the information signal due to the optical taps. The core of the optical waveguide is chosen to substantially minimize the spot size of signals at the wavelength of the pump source so as to provide preferential extraction of the information signal in order to leave the pump source substantially undisturbed to be able to pump regions of the amplifying waveguide beyond the optical tap.

18 Claims, 6 Drawing Sheets

OPTICAL FIBER AMPLIFIED TAPPING NETWORK AND METHOD USING SAME

This application is a 371 of PET/GB91/02052, filed Nov. 20, 1991.

BACKGROUND OF THE INVENTION

1. Field of the Invention

This invention relates to optical networks and in particular to optical networks in which an optical waveguide of a given refractive index profile has a waveguiding core surrounded by a cladding to which is coupled a source of optical information signals at a first wavelength, an optical amplifier, and a source of optical pump power at a second wavelength shorter than the first wavelength for optically pumping the optical amplifier.

2. Related Art

It is envisaged that optical networks will be made from various types of optical waveguides and optical amplifying technologies, for example, planar $Si-SiO_2$ waveguides, plastics or polymer based fibre guides, planar doped waveguide amplifiers and so on.

A particular example of such a network is described in the applicant's co-pending patent application WO 90/09708 published on the 20 Aug. 1990 which network is designed to provide a multiple access interconnection scheme which can be exploited for both static and dynamic interconnect applications. This network is based on optical fibre waveguides. The teaching of this patent application is imported in full into this application by reference.

The spatial dimension of such an interconnection network can be based on optical D-fibres, for example. See for example Cassidy S. A. et al, 1989 "Extendable Optical Interconnection Bus Fabricated using D-Fibre" IOOC 1989, Kobe, Japan, Paper 21 D2-1 pp 88–89. A central component of the design is a multi-fibre backplane for carrying the signals and the reference channels, with discrete tapping points along its length. These tapping points may take the form of array connectors in the known form of crossed D-fibres. The interaction length is determined by the angle of crossover of the crossed D-fibres. Each connector provides a link between each output fibre and its corresponding fibre path on the backplane, evanescently tapping out a small portion of the power from each of the signal and reference channels. The limitation on the number of the tapping points is that eventually the signal level along the backplane will fall below detector levels (as each tap removes a small portion of signal).

The use of erbium doped fibres, either distributed or in discrete amplifier units, allows amplification of the signal in the 1.55 $\mu$m window. The amplification can be arranged to maintain the output from all the tapping points on the bus above the detector power limit. The signal power is regenerated by amplification between tapping points, thus allowing a significantly larger number of user ports to be served. It is convenient to distribute the pump power along the waveguide to the fibre amplifiers from a single pump source rather than provide a separate pump source for each amplifier. However, a small amount of pump power will also be removed at each tapping point and so wasted.

SUMMARY OF THE INVENTION

According to the present invention an optical network includes an optical waveguide having a waveguiding core surrounded by a non-guiding region, and a given refractive index profile, to which is coupled a source of optical information signals of a first wavelength, an optical amplifier, and a source of optical pump power of a second wavelength shorter than the first wavelength for optically pumping the optical amplifier and is characterised in that the core of the optical waveguide is chosen to substantially minimise the spot size of signals at the second wavelength and there is a region at which the cladding is sufficiently thin to allow evanescent coupling to the signals at the first wavelength.

The present invention is based on the realisation that if the core of a waveguide is such as to substantially minimise the spot-size at the shorter of two wavelengths, the spot size of a longer wavelength signals will be past its minimum and be diverging from the shorter wavelength spot size. This means that an evanescent coupler formed from such a waveguide will evanescently couple less efficiently at short wavelengths than at long wavelengths thereby providing a selective optical tap to selectively couple out or tap an information signal preferentially to a shorter wavelength pump signal in optical networks with optically pumped optical amplifiers.

Aspects of the present invention are as disclosed in the accompanying claims.

BRIEF DESCRIPTION OF THE DRAWINGS

An embodiment of the invention will now be described, by way of example only, with reference to the accompanying drawings of which.

DETAILED DESCRIPTION OF EXEMPLARY EMBODIMENTS

Figure 1:
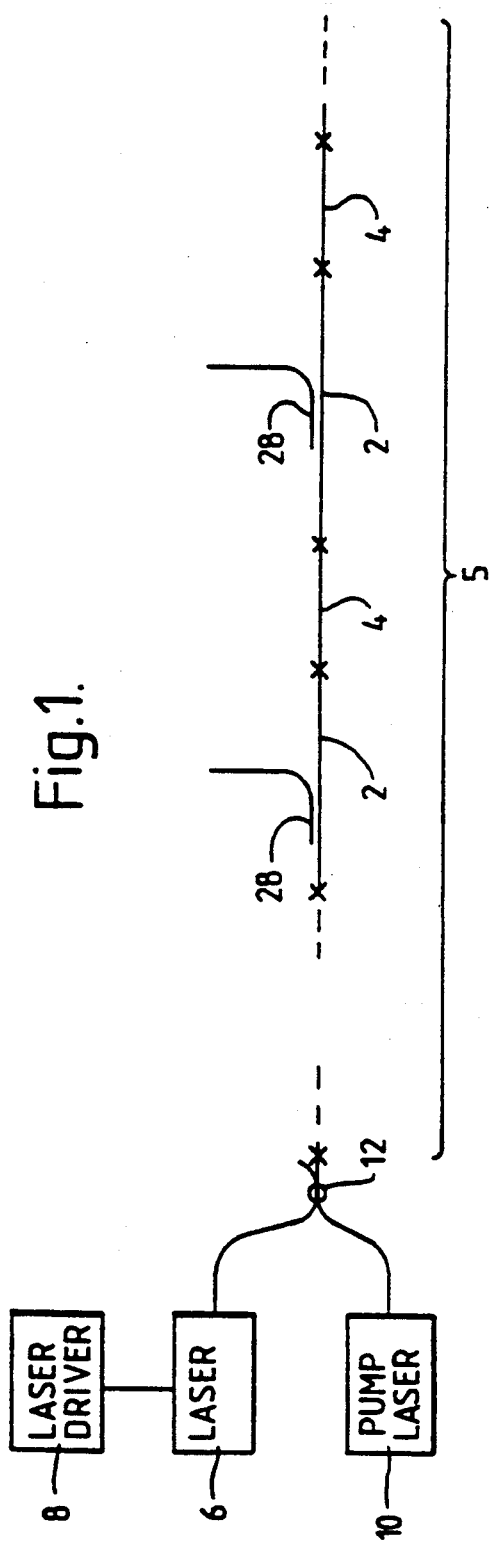
FIG. 1 is a schematic diagram of an embodiment of an optical network according to the present invention.

Referring to FIG. 1, an exemplary optical network embodying the present invention comprises a series of silica-based optical D-fibres 2 spliced at the positions marked "X" to interposed erbium optical fibre amplifiers 4 which collectively form an optical bus 5. A laser 6 has a 1.55 μm output which is modulated with information by a laser driver 8 in known manner.

The optical amplifiers 4 are pumped at 0.98 μm by a pump laser 10 whose output is combined with the information signal from the laser 6 by a commercially available 980/1530 dichroic optical fibre coupler 12 spliced to the optical bus 5.

Figure 2:
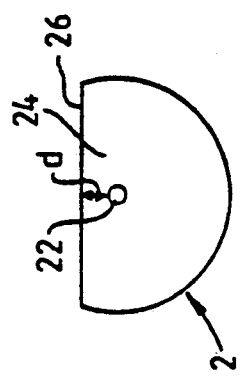
FIG. 2 is a cross-sectional view of a D-fibre optical waveguide suitable for use with the embodiment of FIG. 1.

The D-fibres 2 were formed by the well known method of sawing an optical fibre preform to form a longitudinal flat along the preform and then drawing the optical fibre down to the required size in the usual manner. This forms an optical fibre 2 having a D-shaped cross-section (see FIG. 2) with a waveguiding core 22 surrounded by a non-waveguiding cladding 24 having a flat surface 26 d μm from the core 22.

A similarly formed optical D-fibre 28 when placed with its flat surface close to the flat surface of the optical fibre 2, as shown in FIG. 1, will be able to couple out an optical signal propagating along the core 22 of the fibre 2 if the spot size of the optical signal extends sufficiently far from the core 22. The amount of that signal tapped out of the core 22 of the fibre 2 will depend, amongst other things, on the value of d, the interaction length between the fibres 2 and 28.

Figure 3:
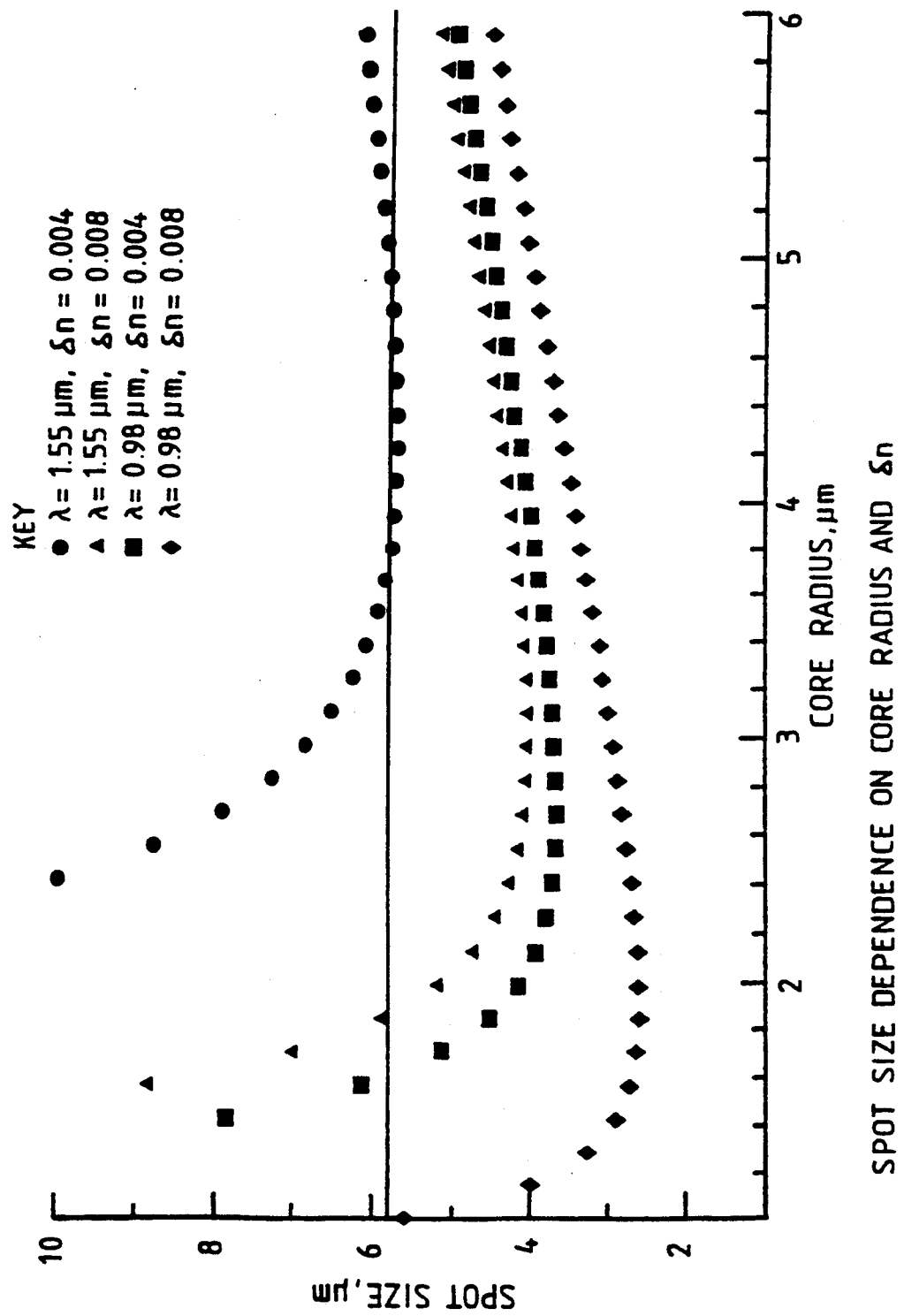
FIG. 3 is a graph showing the spot size as a function of core radius, refractive index profile and signal wavelength.

FIG. 3 shows the spot size dependence on core radius at two signal wavelengths, 1.55 μm and 0.98 μm and at two refractive index profiles characterised by their effective step index values δn, of 0.004 and 0.008. The larger the δn value the greater the differential tapping obtainable.

The design criteria for an optimum optical network shown in FIG. 1 include a requirement that there is a maximum rejection of pump over signal while maintaining a sensible interaction length with consequently achievable coupling tolerances and a need to maintain low system-to-device splice losses at the signal wavelength. To achieve this the spot size of the waveguide should have an effective step index value δn such that when the spot size at the pump wavelength is substantially minimised, the spot size of the signal wavelength is substantially matched to that of the system waveguide. Achieving this also ensures that the bend sensitivity of the waveguide is not increased.

From FIG. 3 it can be seen that for δn=0.004 the fibre should be fabricated with a core radius in the region of a 3 μm to minimise the spot size at the pump wavelength of 0.98 μm. This core size, however, results in a mismatch of spot size at the signal wavelength between the fibre and the 5, 8 μm spot size of a standard telecommunications fibre to which the waveguide, in this example, is to be spliced.

A fibre having a δn over 0.008, however, will have the minimum spot size at the pump wavelength for a core radius of about 1.3 μm which also provides a match of the spot size of the signal wavelength to that of the standard telecommunications fibre.

The preform can then be altered, if necessary, to ensure that the pulled fibre has both the required core radius and a cladding diameter of 125 μm to ease splicing to standard system fibre.

The graph at FIG. 3 indicates the spot size in μm necessary to provide minimum splice loss to a standard telecommunications fibre, namely 5, 8 μm. The FIG. 3 graph indicates that it is possible to operate in a regime where the spot size at 1.55 μm has passed its minimum value and is diverging rapidly with decreasing wavelength, while that at 0.98 μm is close to its minimum value. Evanescent coupling will thus take place more strongly at the longer wavelength producing a wavelength selective (dichroic) tap. It is worth noting that the variation in cross-coupled power for the dichroic tap is less than 0.5 dB over the 1.55 μm window. Where amplification is not required, the tap can be designed to be broad band over both 1.3 μm and 1.55 μm windows.

The degree of selectivity is dependent on the refractive index difference, with a higher index difference giving a highly selective tap while a low δn gives a broad band tap.

For any particular D-fibre geometry, the wavelength dependence of cross-coupled power increases with core separation, as does the interaction length required for a given level of coupling. It is therefore possible to trade increased rejection of shorter wavelengths for increased interaction length, by choosing the appropriate d-value (effectively the core to core separation). Providing a longer interaction length requires the two D-fibres to cross at a smaller angle. This makes the tap more susceptible to small errors in alignment and manufacture, and hence tighter tolerances would be required to achieve the same level of coupling.

Figure 4:
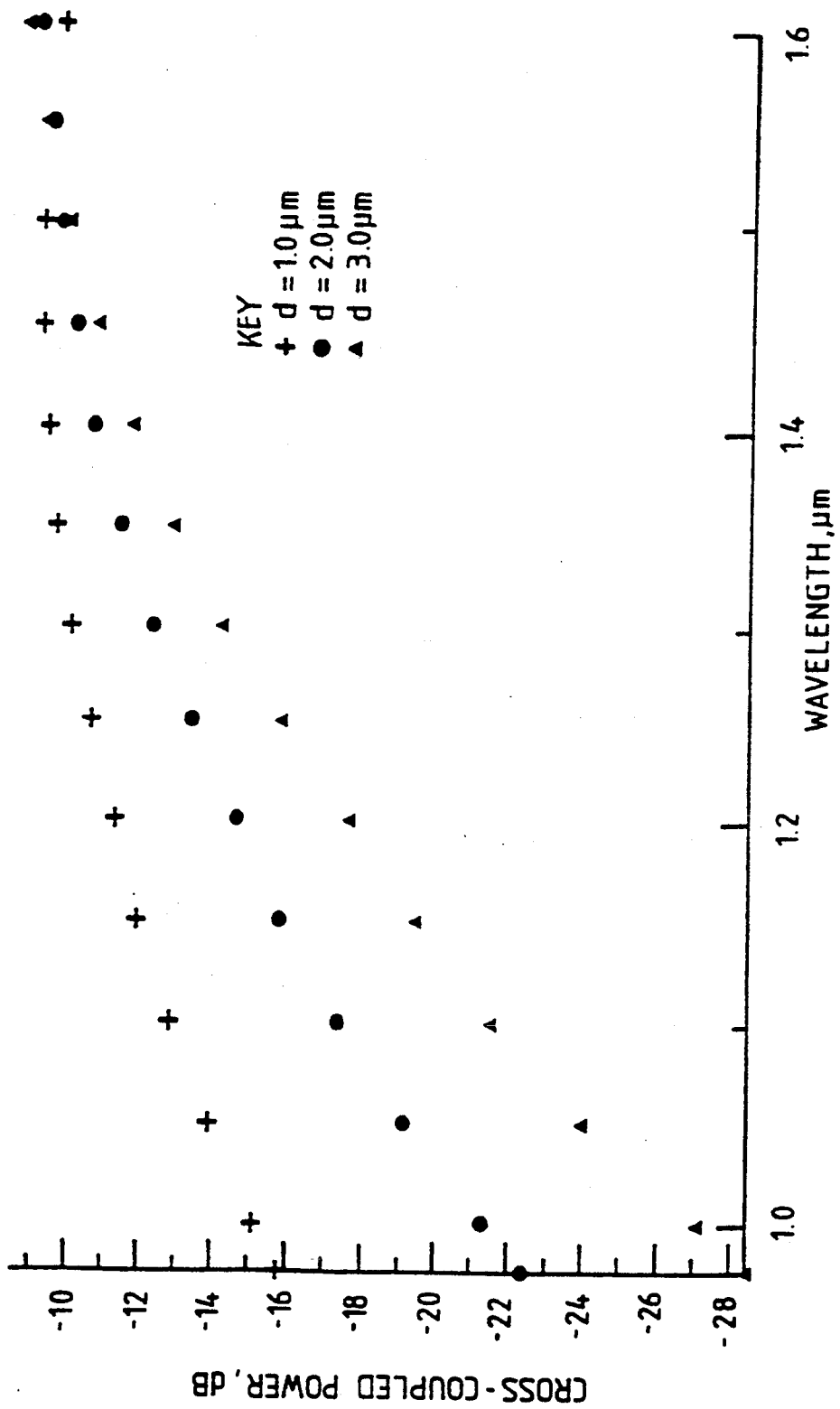
FIG. 4 is a graph showing the theoretical wavelength dependence of cross-coupled power from the waveguide of the embodiment of FIG. 1.

Computer simulation of the coupling between croseed D-fibres of various d-values allows the wavelength dependence of the tap to be predicted. FIG. 4 shows the theoretical wavelength dependence of a 10% tap for d-values of 1 μm, 2 μm and 3 μm. The interaction lengths required for this level of coupling are 150 μm, 250 μm and 420 μm respectively. This is comparable to the lengths reported for previous demountable taps and hence the manufacturing tolerances required are of the same order. The predicted rejection of 0.98 μm pump over signal at 1.55 μm is 13 dB for d=2 μm. A tap was fabricated from a length of D-fibre of δn=0.0067 and core radius 2.2 μm. The d-value was 2.1 μm. The coupling ratio of 10% was easily achieved, indicating that the required manufacturing tolerances were met.

Figure 5:
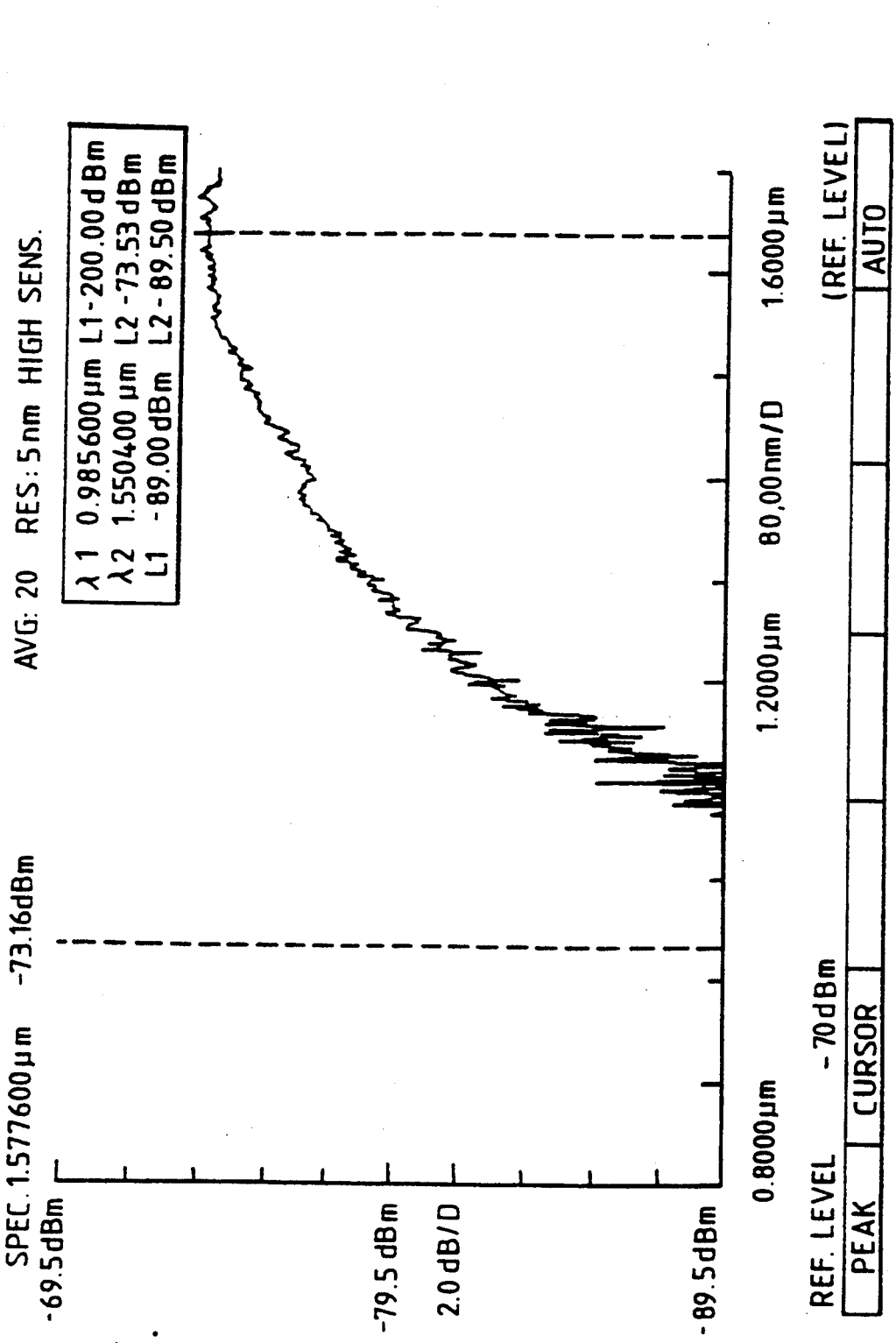
FIG. 5 is a graph of the spectrum analyzer plot of the actual cross-coupled power of the waveguide of FIG. 2.

FIG. 5 shows the spectrum analyzer plot for the cross-coupled leg of the tap. The through-loss of the bus fibre, with system fibre tails, showed no wavelength dependence. The wavelength dependence of the cross-coupled power follows the theoretical curve for the longer wavelengths. Departures from the theory occur at wavelengths below 1.1 μm. Further investigation showed that a sharp fall off in receiver sensitivity occurs at these wavelengths for powers below −80 dBm. Direct measurement of the relative powers coupled for source wavelengths of 0.98 μm and 1.54 μm showed a rejection of 10.7 dB, which is in good agreement with the theoretical value. Using taps of the cross D-fibre type described reported here, with a signal tapping coefficient of 10%, 80 ports could be connected to a bus backplane before −3 dB of pump power was lost. This rejection could be further increased at the expense of using a longer device interaction length.

Figure 6:
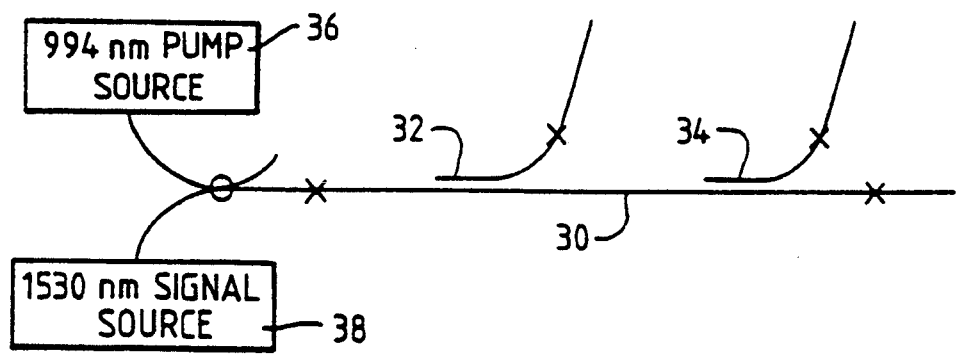
FIG. 6 is a schematic diagram of a further embodiment of an optical network according to the present invention.

Referring now to FIG. 6 there is shown an experimental arrangement used for determining the characteristics of a network according to the present invention which is the same as the FIG. 1 embodiment except that the D-fibres 2 and erbium fibre amplifiers 4 are all formed from a single, erbium-doped D-fibre rather than being separate erbium fibre amplifiers spliced between sections of non-amplifying D-fibre. In this arrangement there are two taps, 32 and 34, on a waveguide 30.

The dopant density of the erbium doped D-fibre 30 of the arrangement of FIG. 6 had a dopant density of $5.5 \times 10^{18}$ ions/cc. The output from each tap 32, 34 and the waveguide 30 output were power monitored. The distance between the two tapping points 32, 34 was approximately 10 cm. a semiconductor diode laser 36 fabricated by British Telecom Laboratories operating at a wavelength of 994 nm giving an input power level on the waveguide 30, or spine, of 1.3 mW provided the pump power for the amplifying waveguide 30.

A signal wavelength was supplied by a DFB laser 38 operating at a wavelength of 1.53 μm and giving an output power level of about 1.53 μW. In the unpumped state, the tap ratio at each coupler 32, 34 was set at 7% (−11.5 dB). With the pump laser off, the power level of the output of the second tap 34 was 0.65 dB lower than at the first tap 32. This was due to the power removed at the first tap 32 (0.3 dB) and doped fibre absorption of 0.35 dB between the taps 32 and 34. When the pump laser 36 was subsequently switched on and off, the modulations superimposed on the power output from the second tap 34 was seen to be 0.65 dB, ie the power levels were equal at the two tap outputs while the pump laser 36 was on.

Figure 7:
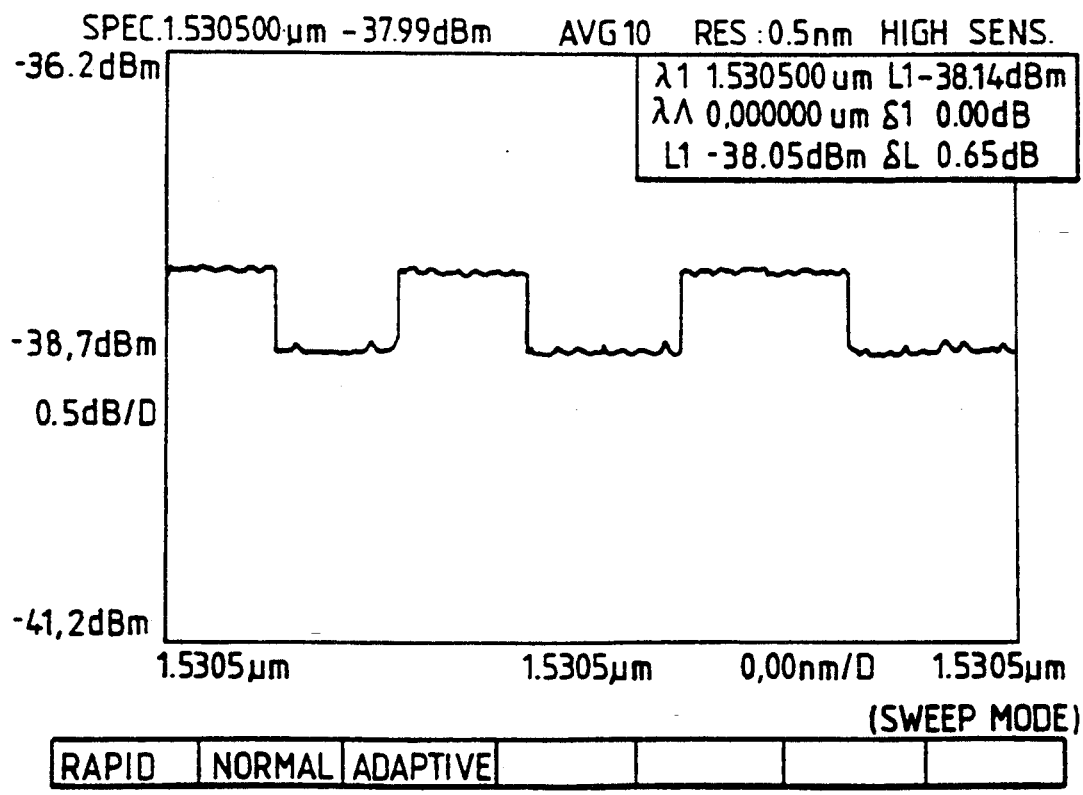
FIG. 7 is a graph showing the modulation of the output of a coupler of the embodiment of FIG. 6 as a function of pump power.

Referring now to FIG. 7 there is shown the signal power level at the second tap 34 of FIG. 6 as a function of time. A signal modulation, due to the pump laser 36 being switched on and off, is clearly visible. The corresponding modulation at the first tap 32 was barely discernable having a peak to peak variation of about 0.03 dB.

Measurement of the cross-coupled power levels at 0.994 μm and 1.53 μm gave a rejection value of pump over signal of 34.5 dB. The loss of pump power by this mechanism is therefore negligible.

A variety of amplification strategies and regimes may be considered. A simplified doped fibre analysis has been developed to aid understanding of the options available. One attractive option is to make the most efficient use of the pump power available by optimising dopant levels to maximise tap number and to meet a simple constraint—the spine power at the first and final tap of a network should be equal. The maximum number of taps will be served with a dopant level if it is such as to produce a small net gain over approximately the first half of the bus, becoming a net loss further along the spine as the pump power is absorbed.

Although the differential spot size of signal and pump optical signal provides differential tapping values at the two wavelengths, further flexibility in system design of an optical network utilizing the present invention may be obtained by tailoring the wavelength characteristics of the taps to suit a particular application. Increased wavelength selectivity can be obtained by using non-identical D-fibres. With such a coupler it is known that 100% coupling between the coupled waveguides is only possible when the difference in propagation constants for the coupled wavelength is zero and the interaction length of the coupler is equal to that required for complete power transfer from one waveguide to the other.

Figure 8:
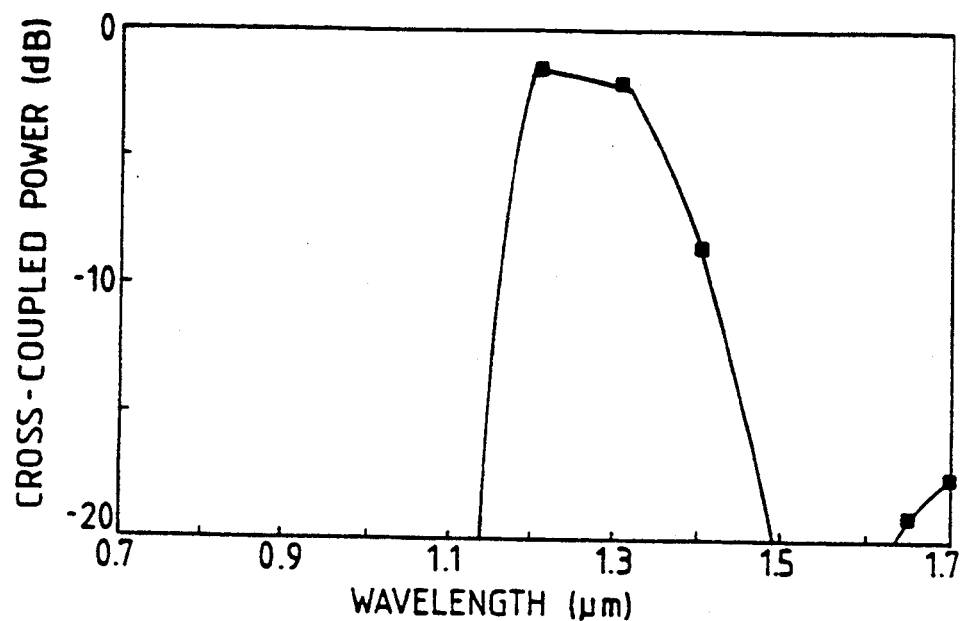
FIG. 8 is a graph of the theoretical cross-coupled power as a function of wavelength.

From computer modelling of an optical tap response, the D-fibre can be designed to give a chosen wavelength tapping characteristic. FIG. 8 shows the predicted cross-coupled power spectrum for coupling between D-fibres of δn=0.004 and δn=0.0105 for an interaction length optimised for 1.3 μm.

Figure 9:
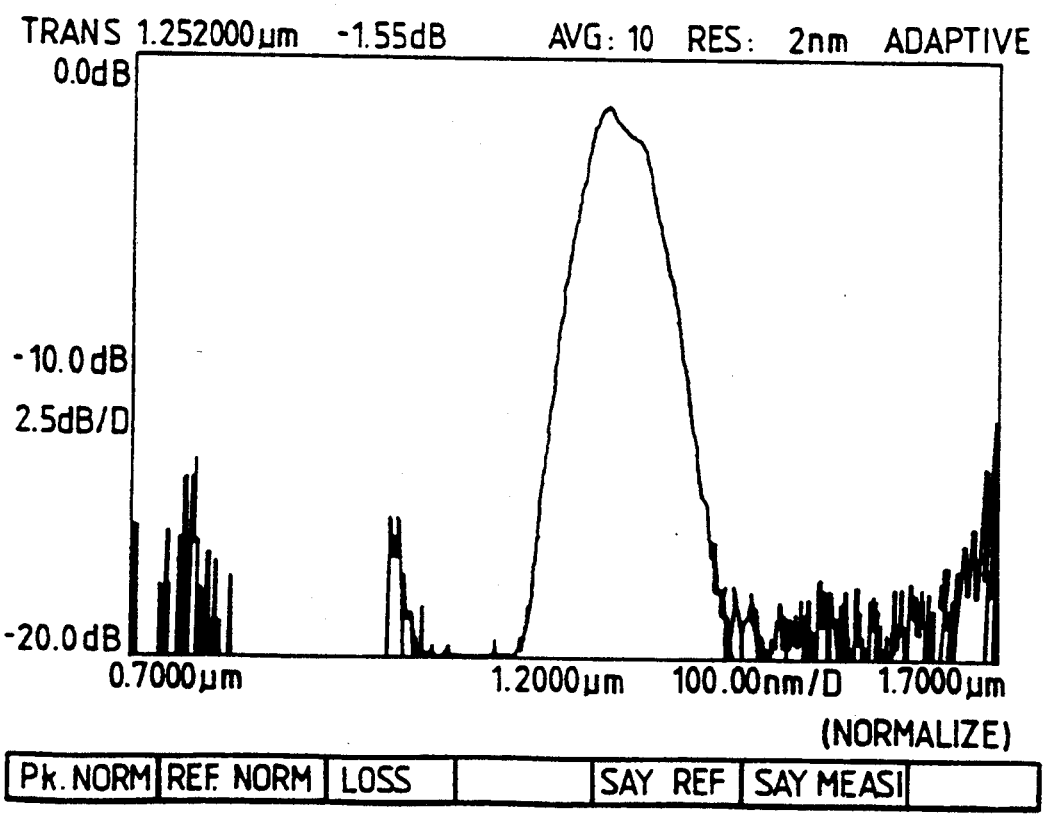
FIG. 9 is a graph of the experimentally obtained cross-coupled power as a function of wavelength.

For this pair of fibres the difference in propagation constants was equal to zero at 1.23 μm and hence 100% coupling at 1.3 μm is not achieved. The experimental plot for the same pairs of fibres is shown in FIG. 9 and corresponds closely with the theoretical prediction shown in FIG. 8. A change of waveguides such that the difference in propagation constant was equal to zero at a value of around 1.53 μm (by changing δn of one of the fibres, for example, will produce a similar narrow band tap for the 1.55 μm window). This would be ideal for a dual wavelength application as it would allow taps to be attached to the waveguide with connection being made over a chosen wavelength band.

We claim:

1. An optical network including:
   an optical waveguide having a waveguiding core surrounded by a non-guiding region, and a given refractive index profile, to which is coupled a source of optical information signals of a first wavelength, an optical amplifier, and a source of optical pump power of a second wavelength shorter than the first wavelength for optically pumping the optical amplifier,
   the core of the optical waveguide being chosen to substantially minimise the spot size of signals at the second wavelength,
   a plurality of evanescent optical couplers coupled with said optical waveguide, each of said couplers comprising a region at which the cladding of the waveguide is sufficiently thin to allow evanescent coupling to the signals at the first wavelength whereby a portion of said signals is removed for output, and
   said amplifier being adapted to amplify the remaining signals at the first wavelength passing along said waveguide after said removal to compensate for the attenuation caused by said removal.

2. A network as in claim 1 in which the optical amplifier comprises an optical fibre amplifier.

3. A network as in claim 2 in which the spot size of the information signal of a first wavelength is substantially the same in the optical waveguide as in the optical fibre amplifier.

4. A network as in claim 1 in which the optical waveguide is doped with an active medium and constitutes the optical amplifier.

5. A network as in claim 1 in which the optical waveguide is spliced to a further optical fibre and the spot size of the information signal is substantially the same in the optical waveguide and the further optical fibre.

6. An optical network as in claim 1 in which the optical waveguide is an optical fibre having a D-shaped cross-section.

7. An optical network as in claim 1 in which the optical amplifier comprises a rare earth doped silica-based optical fibre.

8. An optical network as in claim 7 in which the rare earth comprises erbium.

9. An optical network as in claim 1 in which the first wavelength is approximately 1.55 μm and the second wavelength is approximately 0.98 μm.

10. An optical network as in claim 1 in which the couplers comprise crossed optical fibres each having a D-shaped cross-section.

11. An optical network as in claim 1 in which the coupler is wavelength selective.

12. An optical network as in claim 11 in which the optical waveguides comprising the optical coupler have different propagation constants.

13. An optical device which comprises:
   (a) an optical signal generator for providing a first optical signal at a first wavelength;
   (b) a plurality of output ports, and (c) an optical network interconnecting (a) with all of (b); wherein (c) comprises:
- (c)(i) an optical fibre waveguide connected to (a) and all of (b),
- (c)(ii) an optical fibre amplifier included in (c)(i),
- (c)(iii) an optical pump for providing optical power at a second wavelength adapted to drive (c)(ii), and
- (c)(iv) a plurality of wavelength selective optical couplers each of which couples one of the (b) to (c)(i);

wherein (c)(ii) is adapted to amplify said first signals between each pair of optical couplers so as to compensate for the power removed by the previous coupler.

14. An optical device according to claim 13, which also comprises a laser driver for modulating the output of (a) whereby a modulated signal is provided to all of the output ports.

15. An optical device which comprises:
(a) an optical signal generator for providing optical signals at a first wavelength;
(b) a laser driver for controlling (a) so as to produce modulated signals therefrom;
(c) a plurality of output ports, and
(d) an optical network interconnecting (a) with all of (b); wherein (d) comprises:
- (d)(i) an optical fibre waveguide containing a lasing dopant for amplifying optical signals at said first wavelength,
- (d)(ii) a pump connected to (d)(i) for providing optical signals at a second wavelength adapted for interaction with the lasing dopant of (d)(i) so as to provide said amplification,
- (d)(iii) a series of wavelength selective optical couplers spaced along (d)(i) each coupler being adapted to provide modulated signals to one of said output ports;

wherein each of said couplers provides a portion of signals at the first wavelength to its output port allowing the remainder to continue in (d)(i) and to provide substantially all of said pump radiation at said second wavelength into (d)(i) whereby the modulated signals are amplified between each pair of couplers to compensate for the signal removed.

16. An optical device which comprises:
(a) an optical signal generator for providing optical signals at a first wavelength;
(b) a laser driver for controlling (a) so as to produce modulated signals therefrom;
(c) a plurality of output ports; and
(d) an optical network interconnecting (a) with all of (c); wherein (d) comprises:
- (d)(i) an optical D-fibre waveguide containing a lasing dopant for amplifying optical signals at said first wavelength,
- (d)(ii) a pump connected to (d)(i) for providing optical signals at a second wavelength adapted for interaction with the lasing dopant of (d)(i) so as to provide said amplification,
- (d)(iii) a series of wavelength selective optical couplers spaced along (d)(i) each coupler comprising a D-fibre crossing (d)(i) in a configuration adapted to provide modulated signals to one of said output ports;

wherein each of said couplers provides a portion of signals at the first wavelength to an output port allowing the remainder to continue in (d)(i) and to provide substantially all of said pump radiation at said second wavelength into (d)(i) whereby the modulated signals are amplified between each pair of couplers to compensate for the signal removed.

17. A method of providing an optical signal to a plurality of output ports wherein the output at each port contains substantially the same modulation said output being derived from a single, modulated optical signal source, which method comprises:

providing the signals from said single source into a single optical waveguide and tapping the signals from said waveguide to provide said outputs, the proportion of signal removed at each tap being substantially the same, and amplifying the signals between each pair of taps so as to compensate for the signal removed to provide the output.

18. A method according to claim 17, wherein the signals provided at each output have substantially the same strength.

* * * * *